(12) United States Patent
Vangala et al.

(10) Patent No.: US 9,319,985 B2
(45) Date of Patent: Apr. 19, 2016

(54) REDUCING POWER CONSUMPTION THROUGH REDUCED MEASUREMENT FREQUENCY

(71) Applicant: Apple Inc., Cupertino, CA (US)

(72) Inventors: Sarma V. Vangala, San Jose, CA (US); Swaminathan Balakrishnan, Sunnyvale, CA (US); Wael S. Barakat, San Jose, CA (US); Navid Damji, Cupertino, CA (US); Tarik Tabet, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 14/151,969

(22) Filed: Jan. 10, 2014

(65) Prior Publication Data

US 2014/0200002 A1 Jul. 17, 2014

Related U.S. Application Data

(60) Provisional application No. 61/751,900, filed on Jan. 13, 2013.

(51) Int. Cl.
*H04W 52/02* (2009.01)
*H04W 36/00* (2009.01)
(Continued)

(52) U.S. Cl.
CPC ...... *H04W 52/0254* (2013.01); *H04W 36/0088* (2013.01); *H04W 24/10* (2013.01); *H04W 36/0083* (2013.01); *H04W 76/025* (2013.01); *H04W 88/06* (2013.01); *Y02B 60/50* (2013.01)

(58) Field of Classification Search
CPC ............ H04W 24/10; H04W 36/0083; H04W 36/0088; H04W 52/0254; H04W 88/06; H04W 76/025

USPC ......................................................... 455/436
See application file for complete search history.

(56) References Cited

U.S. PATENT DOCUMENTS 6,975,941 B1* 12/2005 Lau ...................... G01C 21/00
                                                   340/539.13
8,326,301 B2  12/2012  Park et al.
(Continued)

FOREIGN PATENT DOCUMENTS

KR  10-2012-0104296  9/2012

OTHER PUBLICATIONS

PCT Application No. PCT/US20141010971—International Search Report & Written Opinion dated Mar. 24, 2014.
(Continued)

*Primary Examiner* — Barry Taylor
(74) *Attorney, Agent, or Firm* — Downey Brand LLP (57) ABSTRACT

A method for reducing power consumption by a wireless communication device is disclosed. The method can include the wireless communication device performing a first measurement of an alternative cell during a first measurement gap; sending a first measurement report generated based on the first measurement to the serving cell; storing the first measurement report; determining a mobility state of the wireless communication device; comparing the mobility state to a mobility threshold criterion; resending the first measurement report to the serving network as a report for a second measurement gap in an instance in which the mobility state satisfies the mobility criterion; and performing a second measurement of the alternative cell during the second measurement gap and sending a second measurement report generated based on the second measurement to the serving cell in an instance in which the mobility state does not satisfy the mobility threshold criterion.

18 Claims, 7 Drawing Sheets

(51) Int. Cl.
*H04W 24/10* (2009.01)
*H04W 76/02* (2009.01)
*H04W 88/06* (2009.01)

(56) References Cited

U.S. PATENT DOCUMENTS

| | | | |
|---|---|---|---|
| 8,451,803 B2 | 5/2013 | Kitazoe | |
| 2003/0218995 A1* | 11/2003 | Kim | H04W 36/0066 370/318 |
| 2011/0117856 A1* | 5/2011 | Veluppillai | H04W 36/32 455/67.11 |
| 2011/0136530 A1 | 6/2011 | Deshpande | |
| 2012/0033595 A1 | 2/2012 | Aoyama et al. | |
| 2013/0040640 A1 | 2/2013 | Chen et al. | |
| 2013/0229931 A1 | 9/2013 | Kim | |
| 2013/0242830 A1* | 9/2013 | Lee | H04W 72/1215 370/311 |

OTHER PUBLICATIONS

Fei, M. et al. "Position-assisted fast handover schemes for LTE-advanced network under high mobility scenarios", Journal of Modern Transportation, vol. 20, No. 4, Dec. 2012, pp. 268-273.

3rd Generation Partnership Project; Technical Specification Group Radio Access Network; Improved Network Controlled Mobility between E-UTRAN and 3GPP2/Mobile WiMAX Radio Technologies (Release 9), 3GPP TR 36.938 V9.0.0 (Dec. 2009), pp. 1-34.

Samsung, "Measurement in DRX", 3GPP TSG-RAN2 Meeting #59 bis R2-07xxxx, Oct. 8-12, 2007; Shanghai, China, pp. 1-4.

Notice of Preliminary Rejection for Korean Patent Application No. 10-2015-7018758, dated Mar. 2, 2016.

* cited by examiner

REDUCING POWER CONSUMPTION THROUGH REDUCED MEASUREMENT FREQUENCY

CROSS-REFERENCE TO RELATED APPLICATION

This application claims the benefit of priority from U.S. Provisional Patent Application No. 61/751,900, filed on Jan. 13, 2013, which is hereby incorporated herein by reference in its entity.

FIELD

The described embodiments relate generally to wireless communications. More particularly, the present embodiments relate to reducing power consumption through reduced measurement frequency.

BACKGROUND

A wireless communication device camped in connected mode on a serving cell can be configured with measurement gaps, which are time intervals during which the wireless communication device can tune away from the serving cell to measure a second cell. The wireless communication device can then send a measurement report to the serving network based on the measurement of the second cell. The serving network can use the measurement report as a basis for handover decisions.

Performing measurements during a measurement gap can be quite costly to the wireless communication device in terms of power consumption. In this regard, a wireless communication device may have to tune away from a frequency used by the serving cell and tune to a second frequency that may be used by a second cell and/or have to temporarily switch from a stack for a radio access technology (RAT) that can be used by the serving cell to a stack that can be used for a second RAT that may be used by the second cell in order to perform measurement of the second cell. The wireless communication device can then perform a measurement of the second cell before transitioning back to the serving cell. This process of tuning away from the serving cell to perform a measurement of the second cell and then returning to the serving cell can be intensive in terms of power consumption, which can limit battery life and negatively impact user experience. However, in many cases, the performance of measurements during measurement gaps does not yield any additional information beyond that known from a prior measurement.

SUMMARY

Some example embodiments disclosed herein reduce power consumption by a wireless communication device through reduced measurement frequency. More particularly, some example embodiments provide a wireless communication device configured to selectively determine whether to perform a measurement during a measurement gap based at least in part on a mobility state of the wireless communication device. In this regard, the wireless communication device of some such example embodiments can compare a mobility state of the device to a mobility threshold criterion. If the mobility state satisfies the mobility threshold criterion, such as if the device is in a stationary state or not in a relatively high state of mobility, the device can resend a previous measurement report to the serving network without performing a new measurement, as a new measurement may not yield any significant new information. As such, power consumption can be saved by omitting performance of a new measurement. However, if the mobility state does not satisfy the mobility threshold criterion, such as if the device is moving, the wireless communication device of some example embodiments can perform a new measurement during a measurement gap and can send a new measurement report generated based on the new measurement to the serving network, as the new measurement may yield new information.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Many measurement reporting schemes are network centric in the sense that handover decisions can be decided by a serving base station based on measurement parameters that can be reported back by a wireless communication device based on measurements that can be captured during measurement gaps. For example, in Long Term Evolution (LTE) networks, A1/A2/A3/A4 and B1/B2 measurement reports can be reported to a serving evolved node B (eNB) to enable the eNB to make a handover decision.

As an example, in the case of inter-RAT (iRAT) measurements, the wireless communication device may have to use the appropriate stack for the alternative RAT being measured in accordance with a measurement pattern that can be indicated by the serving base station. In this regard, during a measurement gap, the wireless communication device can transition to a stack associated with the alternative RAT to measure the parameters of a cell of the alternative RAT. The wireless communication device can then generate a measurement report based on the measurement and send the measurement report to the serving base station.

For example, if a wireless communication device is on a fourth generation (4G) network cell and measures a third generation (3G) network cell during a measurement gap, then the wireless communication device can perform the following steps:
- (0) Loop over steps 1-4 as indicated by the eNB if the wireless communication device is in a defined reference signal received power (RSRP) range.
- (1) Shut down (e.g., deactivate) the 4G radio frequency (RF) stack,
- (2) Activate the 3G RF stack, perform measurements of the 3G network cell, and retain the measurement values
- (3) Shut down (e.g., deactivate) the 3G RF stack
- (4) Reactivate the 4G RF stack
- (5) Send the retained measurement values in case of the expiry of a measurement report timer In 4G systems, a typical defined range for measurement gaps to be triggered is from −120 decibels (dB) to −90 dB, which can include the complete coverage area of a cell. This range can accordingly result in measurement gaps almost always being triggered during operation of a wireless communication device. When measurement gaps are triggered, measurement gaps can occur periodically, such as every 40-80 milliseconds in accordance with a schedule that can be configured by the serving base station. The periodicity of some types of measurement reports may be higher than others. In this regard, some types of measurements can be performed and/or some times of measurement reports can be sent more frequently than other types.

The performance of measurements can be costly in terms of power consumption, resulting in increased battery consumption by a wireless communication device. However, a measurement often does not yield any new information for forming a measurement report beyond information known from a previous measurement. For example, if a wireless communication device has remained stationary, or has moved only a relatively small distance since a previous measurement, there may not be a difference of any significance between a new measurement and the previous measurement.

Some example embodiments accordingly provide for reducing power consumption by a wireless communication device through reduced measurement frequency. More particularly, some example embodiments provide a wireless communication device configured to selectively determine whether to perform a measurement during a measurement gap based at least in part on a mobility state of the wireless communication device. In this regard, the wireless communication device of some example embodiments can compare a mobility state of the device to a mobility threshold criterion. If the mobility state satisfies the mobility threshold criterion, such as if the device is in a stationary state or not in a relatively high state of mobility, the device can resend a previous measurement report to the serving network without performing a new measurement, as a new measurement may not yield any significant new information. However, if the mobility state does not satisfy the mobility threshold criterion, such as if the device is moving, the wireless communication device of some example embodiments can perform a new measurement during a measurement gap and can send a new measurement report generated based on the new measurement to the serving network, as the new measurement may yield new information. Such example embodiments can accordingly conserve power by reducing a frequency of measurements, as a wireless communication device in accordance with such embodiments can avoid performing measurements in an instance in which it is deemed based on the device's mobility state that a new measurement may not yield new information beyond information known from a previous measurement.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
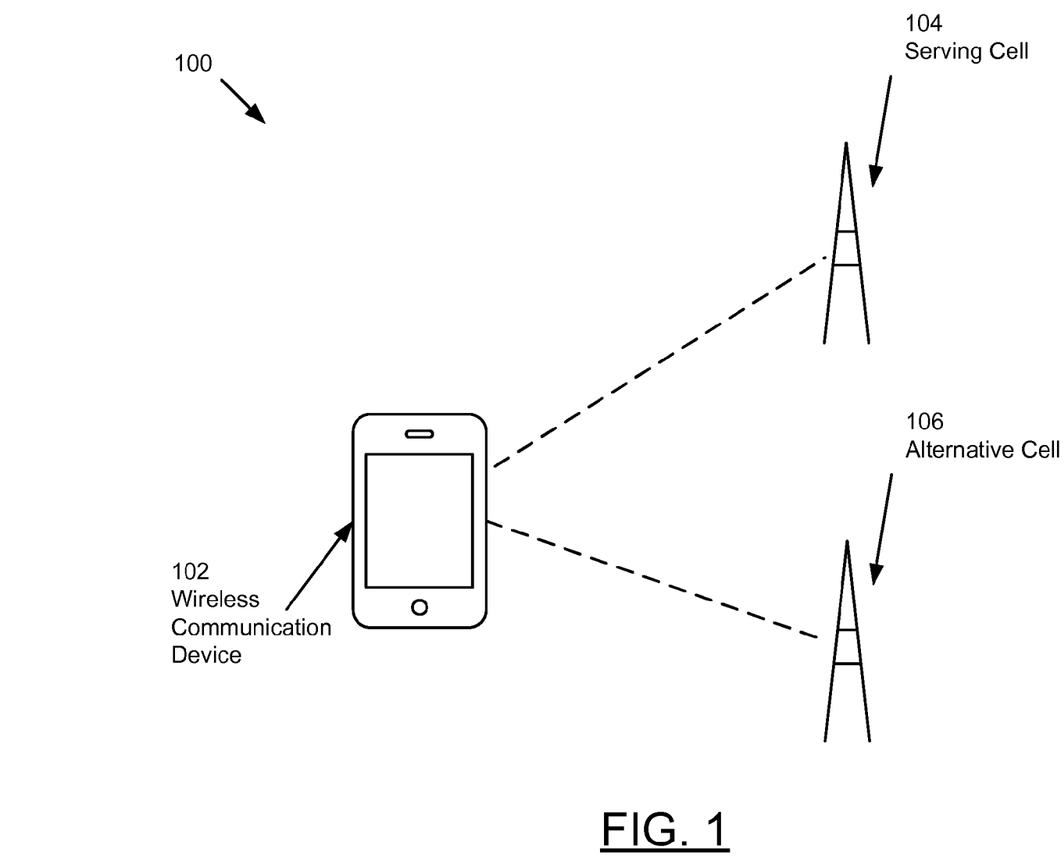
FIG. 1 illustrates a wireless communication system in accordance with some example embodiments.

FIG. 1 illustrates a wireless communication system 100 in accordance with some example embodiments. The wireless communication system 100 can include a wireless communication device 102. By way of non-limiting example, the wireless communication device can be embodied as a cellular phone, such as a smart phone device, a tablet computing device, a laptop computing device, and/or other computing device that can be configured to communicate over one or more cellular networks. The wireless communication device 102 can be connected to a serving cell 104 of a serving network. In this regard, the wireless communication device 102 can be in a connected mode, such as radio resource control (RRC) connected mode, on the serving network.

The serving cell 104 can implement any RAT that can be implemented by the serving network. In some example embodiments, the serving cell 104 can implement a 4G RAT, such as an LTE RAT (e.g., LTE, LTE-Advanced (LTE-A), or other LTE technology). As a further example, in some example embodiments, the serving cell 104 can implement a 3G RAT, such as Wideband Code Division Multiple Access (WCDMA) or other Universal Mobile Telecommunications System (UMTS) RAT, such as Time Division Synchronous Code Division Multiple Access (TD-SCDMA). As further examples of 3G RATs that can be implemented by the serving cell 104, in some example embodiments, the serving cell 104 can implement a CDMA2000 RAT, such as 1xRTT, or other RAT standardized by the Third Generation Partnership Project 2 (3GPP2). As another example, in some example embodiments, the serving cell 104 can implement a second generation (2G) RAT, such as a Global System for Mobile Communications (GSM) RAT. It will be appreciated, however, that the foregoing example RATs are provided by way of example, and not by way of limitation. In this regard, it will be appreciated that the serving cell 104 can implement any present or future developed cellular RAT, including, for example, various fifth generation (5G) and beyond RATs.

The wireless communication device 102 can be configured by the serving cell 104 with measurement gaps in which the wireless communication device 102 can measure other cells (e.g., neighbor cells) that can be within signaling range of the wireless communication device 102. For example, a base station associated with the serving cell 104 (e.g., the serving base station for the wireless communication device 102) can provide the wireless communication device 102 with a measurement gap configuration. The configured measurement gaps can, for example, be provisioned by and/or negotiated with the serving network. The measurement gaps can be configured to enable the wireless communication device 102 to perform any of a variety of inter-cell measurements. For example, measurement gaps can be configured to enable the wireless communication device 102 to perform measurements (e.g., inter-frequency measurements) of neighboring cells on the serving network. Additionally or alternatively, measurement gaps can be configured to enable the wireless communication device 102 to perform iRAT measurements, in which the wireless communication device 102 can perform a measurement of a cell on a network using a RAT other than the RAT used by the serving cell 104 and serving network.

The wireless communication device 102 can perform a measurement of another cell during a measurement gap and generate a measurement report based on the measurement and send the measurement report to the serving cell 104. The measurement report can be used by the serving cell 104 as a basis for determining whether to perform a handover of the wireless communication device 102 to another cell. By way of non-limiting example, an inter-frequency handover to a neighboring cell, an iRAT handover, and/or other type of handover can be performed in response to a measurement report indicative of a measurement performed during a measurement gap.

The wireless communication device 102 can accordingly be within coverage range of one or more further cells (e.g., neighbor cells of the serving cell 104), including alternative cell 106, which can be selectively measured by the wireless communication device 102 in accordance with the methodology of one or more example embodiments. The alternative cell 106 can implement any of a variety of cellular RATs. For example, in some example embodiments, the alternative cell 106 can implement a 4G RAT, such as an LTE RAT (e.g., LTE, LTE-A, or other LTE technology). As a further example, in some example embodiments, the alternative cell 106 can implement a 3G RAT, such as WCDMA or other UMTS RAT, such as TD-SCDMA. As further examples of 3G RATs that can be implemented by the alternative cell 106, in some example embodiments, the alternative cell 106 can implement a CDMA2000 RAT, such as 1xRTT, or other RAT standardized by 3GPP2. As another example, in some example embodiments, the alternative cell 106 can implement a 2G RAT, such as a GSM RAT. It will be appreciated, however, that the foregoing example RATs are provided by way of example, and not by way of limitation. In this regard, it will be appreciated that the alternative cell 106 can implement any present or future developed cellular RAT, including, for example, various 5G and beyond RATs.

In some example embodiments, the alternative cell 106 can use the same RAT as used by the serving network (e.g., the same RAT as used by the serving cell 104). In this regard, in some example embodiments, the alternative cell 106 can be a neighboring cell of the serving cell 104 on the serving network, and the wireless communication device 102 can perform a neighboring cell measurement, such as an inter-frequency measurement, of the alternative cell 106. Alternatively, in some example embodiments, the alternative cell 106 can be a cell on a network using a RAT other than that used by the serving network, and the wireless communication device 102 can perform an iRAT measurement of the alternative cell 106.

Figure 2:
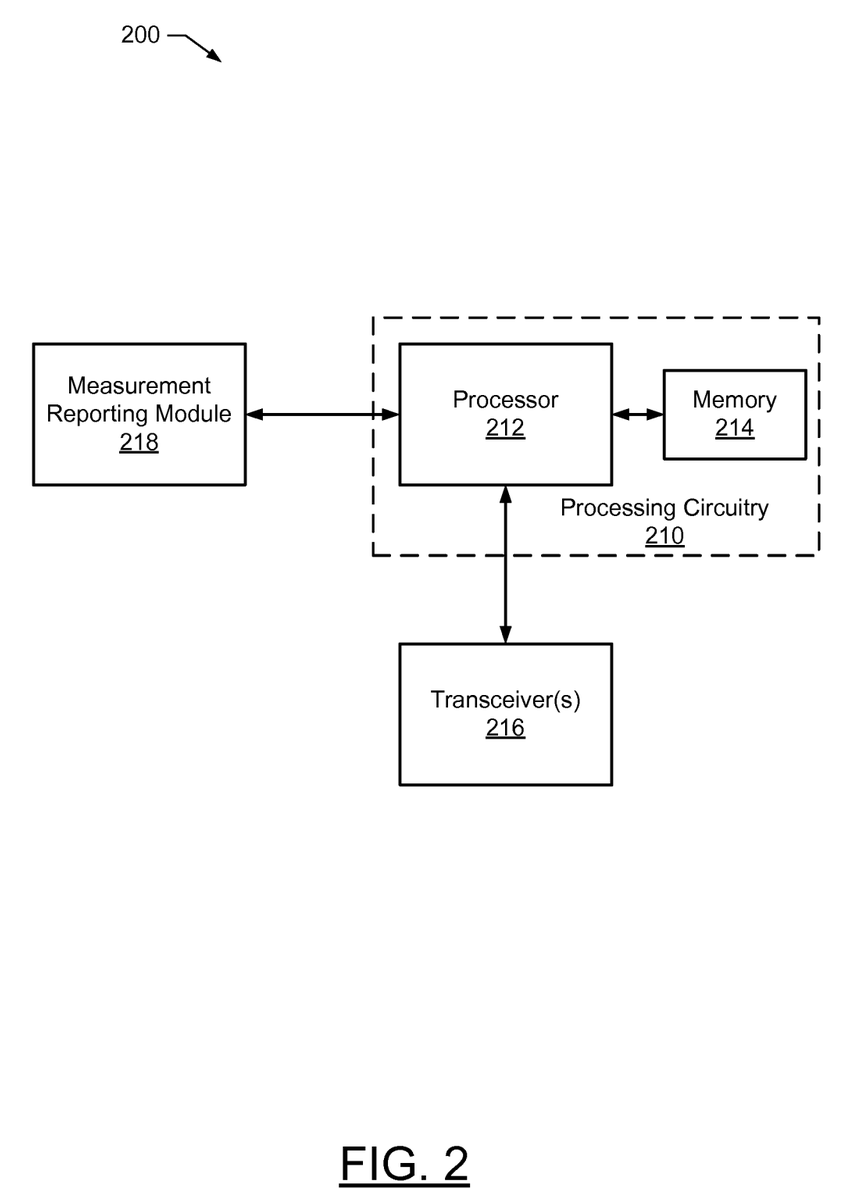
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the wireless communication device 102 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset comprising one or more chips. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a cellular baseband chipset configured to enable a computing device to establish a connection on a cell, such as the serving cell 104 and/or the alternative cell 106, and/or to measure a cell, such as the alternative cell 106.

In some example embodiments, the processing circuitry 210 can include a processor 212 and, in some embodiments, such as that illustrated in FIG. 2, can further include memory 214. The processing circuitry 210 can be in communication with or otherwise control a transceiver(s) 216 and/or measurement reporting module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the wireless communication device 102 as described herein. In some example embodiments, the processor 212 can be configured to execute instructions that can be stored in the memory 214 or that can be otherwise accessible to the processor 212. As such, whether configured by hardware or by a combination of hardware and software, the processor 212 can be capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, or measurement reporting module 218 via a bus (or buses) for passing information among components of the apparatus 200.

The apparatus 200 can further include transceiver(s) 216. The transceiver(s) 216 can enable the apparatus 200 to send wireless signals to and receive signals in accordance with one or more RATs. As such, the transceiver(s) 216 can enable the apparatus 200 to connect to the serving cell 104 and to perform a measurement of the alternative cell 106. As such, the transceiver(s) 216 can be configured to support any type of RAT that can be implemented by the serving cell 104 and/or by the alternative cell 106.

The apparatus 200 can further include measurement reporting module 218. The measurement reporting module 218 can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the measurement reporting module 218.

The measurement reporting module 218 can be configured to selectively determine whether to perform a measurement of the alternative cell 106 during a measurement gap in accordance with various example embodiments, as described further herein below with respect to FIGS. 3-7. The measurement reporting module 218 can be further configured to generate measurement reports based on a measurement of the alternative cell 106 and send such measurement reports to the serving network.

Figure 3:
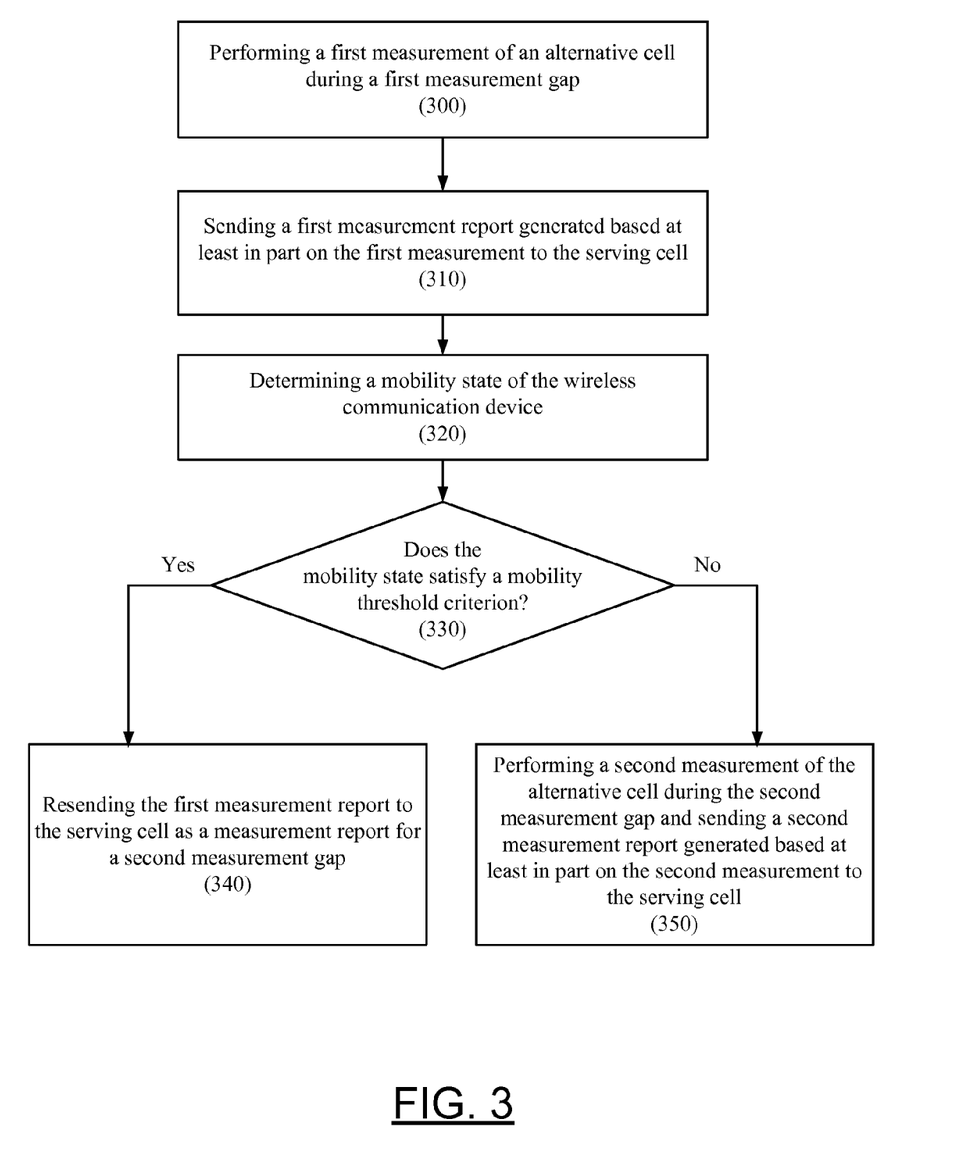
FIG. 3 illustrates a flowchart of an example method for reducing power consumption through reduced measurement frequency in accordance with some example embodiments.

FIG. 3 illustrates a flowchart of an example method for reducing power consumption through reduced measurement frequency in accordance with some example embodiments. In this regard, FIG. 3 illustrates operations that can be performed by the wireless communication device 102 in accordance with various example embodiments. One or more of processing circuitry 210, processor 212, memory 214, transceiver(s) 216, or measurement reporting module 218 can, for example, provide means for performing the operations illustrated in and described with respect to FIG. 3.

When performing the method of FIG. 3, the wireless communication device 102 can be connected to the serving cell 104 (e.g., the serving cell of a serving network for the wireless communication device 102). In this regard, the wireless communication device 102 can be in a connected mode, such as radio resource control (RRC) connected mode, on the serving network.

Operation 300 can include the wireless communication device 102 performing a first measurement of the alternative cell 106 during a first measurement gap. The performed measurement can be any measurement of a signal quality that can be measured for a cell and can, for example, vary based on a type of RAT that can be used by the alternative cell 106. By way of non-limiting example, the measurement that can be performed at operation 300 can include a measurement of a received signal strength indicator (RSSI), reference signal received power (RSRP), reference signal received quality (RSRQ), received signal code power (RSCP), Ec/Io, and/or the like.

Operation 310 can include the wireless communication device 102 sending a first measurement report generated based at least in part on the measurement performed at operation 300 to the serving cell 104. In some example embodiments, the wireless communication device 102 can maintain the first measurement report and/or the measurement upon which the first measurement report was based (e.g., the measurement performed in operation 300) to enable resending of the first measurement report without taking a further measurement of the alternative cell 106 at a subsequent measurement gap. For example, in some embodiments, the wireless communication device 102 can store a copy of the first measurement report, such as in memory 214. The wireless communication device 102 can additionally or alternatively save an indication of the measurement parameter(s) resulting from the measurement of operation 300 to allow regeneration of the first measurement report in the event that the wireless communication device 102 elects to resend the first measurement report for a subsequent measurement gap without making a second measurement of the alternative cell 106.

Operation 320 can include the wireless communication device 102 determining a mobility state of the wireless communication device 102. The mobility state can be determined based at least in part on any measurement that can be indicative of a whether the wireless communication device 102 is in a state of motion (e.g., a mobility state) and/or has moved some distance since the measurement of operation 300 was made.

In some example embodiments, operation 320 can include determining a change in position of the wireless communication device since the measurement of operation 300. For example, a positioning sensor (e.g., a Global Positioning Service and/or other satellite navigation service sensor), accelerometer, and/or other sensor that can be implemented on the wireless communication device 102 of some example embodiments can be used to determine an absolute and/or approximate change in position of the wireless communication device 102 since the measurement of operation 300 in accordance with some such example embodiments.

Additionally or alternatively, in some example embodiments, operation 320 can include determining a velocity of the wireless communication device 102. The determined velocity can be an instantaneous velocity, average velocity, and/or other measurement of a velocity of the wireless communication device 102 at a given point in time and/or over a period of time. For example, a positioning sensor, accelerometer, and/or other sensor that can be implemented on the wireless communication device 102 can be used to determine a velocity of motion of the wireless communication device 102 in such example embodiments.

As yet another example, in some example embodiments, operation 320 can additionally or alternatively include determining a mobility state of the wireless communication device 102 based at least in part on change in a measured signal quality (e.g., RSRP, RSRQ, RSSI, RSCP, Ec/Io, and/or the like) of the serving cell 104 over a period of time. In this regard, the magnitude of a change in signal quality of the serving cell—either an increase in signal quality or a decrease in signal quality—can be indicative of a degree of mobility of the wireless communication device 102 since the measurement of operation 300.

Operation 330 can include the wireless communication device 102 comparing the mobility state determined in operation 320 to a mobility threshold criterion and determining whether the mobility state satisfies the mobility threshold criterion. In this regard, the mobility threshold criterion can correspond to a mobility threshold such that if the mobility state satisfies the mobility threshold criterion, mobility of the wireless communication device does not exceed the mobility threshold.

For example, if the determined mobility state is an absolute change in position of the wireless communication device 102, operation 330 can include determining whether the change in position does exceeds a maximum threshold change in position. If the change in position does not exceed the maximum threshold change in position, the mobility state can be deemed to satisfy the mobility threshold criterion.

As another example, if the determined mobility state is a velocity of the wireless communication device 102, operation 330 can include determining whether the velocity exceeds a maximum threshold velocity. If the velocity does not exceed the maximum threshold velocity, the mobility state can be deemed to satisfy the mobility threshold criterion.

As still a further example, if the determined mobility state is based on a change in a measured signal quality of the serving cell 104, operation 330 can determine whether the change in measured signal quality exceeds a threshold change in signal quality (e.g., a maximum threshold deviation in signal quality). If the change in measured signal quality does not exceed the threshold change in signal quality, then the mobility state can be deemed to satisfy the mobility threshold criterion. As both an increased signal quality and a decreased signal quality can be indicative of mobility, the threshold change in signal quality can be compared to the absolute value of the change in measured signal quality such that the magnitude of the change in measured signal quality can be compared to the threshold change in signal quality. In this regard, if the magnitude of the change in signal quality does not exceed the threshold change in signal quality, then the mobility state can be deemed to satisfy the mobility threshold criterion.

The mobility threshold criterion can be defined based at least in part on whether performance of a second measurement is likely to yield any additional information (e.g., a change in a measured parameter of the alternative cell 106). In this regard, if a mobility state of the wireless communication device 102 is not such that a second measurement is likely to reflect a deviation in a measured parameter of a level that may be of significance to the serving network in making a handover decision, then performance of another measurement during an ensuing measurement gap can be avoided, and the wireless communication device 102 can resend a previously sent measurement report to the serving network. The resulting reduction in the number of measurements can accordingly reduce power consumption and can accordingly prolong battery life.

In an instance in which it is determined at operation 330 that the mobility state does satisfy the mobility threshold criterion, the method can proceed to operation 340, which can include the wireless communication device 102 resending the first measurement report to the serving cell 104 as a report for a second measurement gap. In this regard, if the wireless communication device 102 has maintained a copy of the first measurement report, the wireless communication device 102 can resend the stored copy. Additionally or alternatively, the wireless communication device 102 can regenerate the first measurement based at least in part on a saved indication of the measurement parameter(s) resulting from the measurement of operation 300.

As such, power can be conserved by not performing a second measurement for the second measurement gap, and perhaps even for further measurement gaps, in an instance in which a mobility state of the wireless communication device 102 since the measurement of operation 300 satisfies a mobility threshold criterion. In particular, power can be conserved by avoiding performing operations that may be performed in order to enable measurement of the alternative cell 106. For example, in the case of an iRAT measurement in which the alternative cell 106 uses a different RAT than the serving cell 104, transitioning from a first stack associated with the RAT used by the serving cell 104 to a second stack associated with the RAT used by the alternative cell and transitioning back to the first stack after performance of the measurement can be avoided. As another example, in the case of an inter-frequency measurement in which the alternative cell 106 is a neighbor using a different frequency than the serving cell 104, tuning the transceiver(s) 216 from a first frequency used by the serving cell 104 to a second frequency used by the alternative cell 106 and tuning back to the first frequency after performance of the measurement can be avoided. However, as a measurement report can still be sent (e.g., the resent first measurement report) for the second measurement gap in operation 340, the wireless communication device 102 can still send measurement reports in accordance with a measurement gap configuration, and behavior of the wireless communication device 102 can appear unaltered from the network perspective.

If, however, it is determined at operation 330 that the mobility state does not satisfy the mobility threshold criterion, the method can proceed to operation 350 in lieu of operation 340. Operation 350 can include the wireless communication device 102 performing a second measurement of the alternative cell 106 during the second measurement gap and sending a second measurement report generated based at least in part on the second measurement to the serving cell 104. Thus, for example, in an instance in which a mobility state indicates that a new measurement can yield additional information that can be of value to the serving network in making a handover decision, the wireless communication device 102 can perform a new measurement and send a new measurement report for an ensuing measurement gap.

Figure 4:
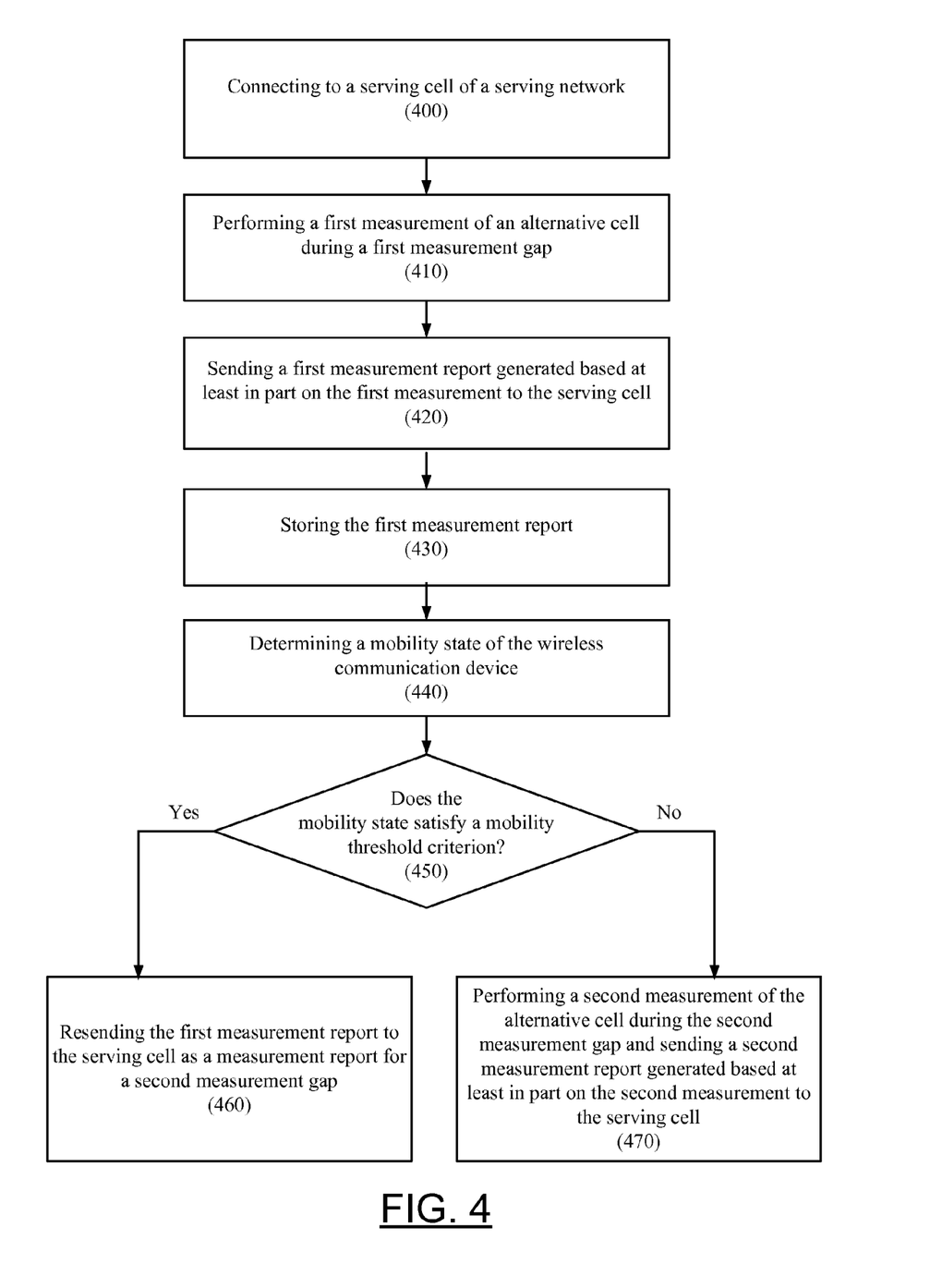
FIG. 4 illustrates a flowchart of another example method for reducing power consumption through reduced measurement frequency in accordance with some example embodiments.

FIG. 4 illustrates a flowchart of another example method for reducing power consumption through reduced measurement frequency in accordance with some example embodiments. In this regard, FIG. 4 illustrates operations that can be performed by the wireless communication device 102 in accordance with various example embodiments. One or more of processing circuitry 210, processor 212, memory 214, transceiver(s) 216, or measurement reporting module 218 can, for example, provide means for performing the operations illustrated in and described with respect to FIG. 4.

Operation 400 can include the wireless communication device 102 connecting to the serving cell 104 of the serving network. In this regard, the wireless communication device 102 can be in a connected mode, such as RRC connected mode, on the serving network.

Operation 410 can include the wireless communication device 102 performing a first measurement of the alternative cell 106 during a first measurement gap. The performed measurement can be any measurement of a signal quality that can be measured for a cell and can, for example, vary based on a type of Rat that can be used by the alternative cell 106. By way of non-limiting example, the measurement that can be performed at operation 410 can include a measurement of an RSSI, RSRP, RSRQ, RSCP, Ec/Io, and/or the like. In this regard, operation 410 can, for example, correspond to an embodiment of operation 300.

Operation 420 can include the wireless communication device 102 sending a first measurement report generated based at least in part on the measurement performed at operation 410 to the serving cell 104. In this regard, operation 420 can, for example, correspond to an embodiment of operation 310.

In some example embodiments, the wireless communication device 102 can maintain the first measurement report to enable resending of the first measurement report without taking a further measurement of the alternative cell 106 at a subsequent measurement gap. In the example method illustrated in FIG. 4, the method can accordingly include operation 430, which can include the wireless communication device 102 storing the first measurement report, such as in the memory 214. It will be appreciated, however, that the wireless communication device 102 can additionally or alternatively save an indication of the measurement parameters resulting from the measurement of operation 410 to allow regeneration of the first measurement report in the event that the wireless communication device 102 elects to resend the first measurement report for a subsequent measurement gap without making a second measurement of the alternative cell 106.

Operation 440 can include the wireless communication device 102 determining a mobility state of the wireless communication device 102. The mobility state can be determined based at least in part on any measurement that can be indicative of a whether the wireless communication device 102 is in a state of motion (e.g., a mobility state) and/or has moved some distance since the measurement of operation 410 was made. In this regard, operation 440 can, for example, correspond to an embodiment of operation 320.

For example, in some example embodiments, operation 440 can include using a positioning sensor (e.g., a Global Positioning Service sensor), accelerometer, and/or other sensor that can be implemented on the wireless communication device 102 to determine an absolute change in position of the wireless communication device 102 since the measurement of operation 410. Additionally or alternatively, in some example embodiments, operation 440 can include using a positioning sensor, accelerometer, and/or other sensor that can be implemented on the wireless communication device 102 to determine a velocity (e.g., an instantaneous velocity and/or average velocity) of motion of the wireless communication device 102 at a point in time and/or over a period of time. As yet another example, in some example embodiments, operation 440 can include the wireless communication device 102 determining a mobility state of the wireless communication device 102 based at least in part on change in a measured signal quality (e.g., RSRP, RSRQ, RSSI, RSCP, Ec/Io, and/or the like) of the serving cell 104 over a period of time.

Operation 450 can include the wireless communication device 102 comparing the determined mobility stat to a mobility threshold criterion and determining whether the mobility state satisfies the mobility threshold criterion. For example, if the determined mobility state is an absolute change in position of the wireless communication device 102, operation 450 can include determining whether the change in position does exceeds a maximum threshold change in position. If the change in position does not exceed the maximum threshold change in position, the mobility state can be deemed to satisfy the mobility threshold criterion. As another example, if the determined mobility state is a velocity of the wireless communication device 102, operation 450 can include determining whether the velocity exceeds a maximum threshold velocity. If the velocity does not exceed the maximum threshold velocity, the mobility state can be deemed to satisfy the mobility threshold criterion. As still a further example, if the determined mobility state is based on a change in a measured signal quality of the serving cell 104, operation 450 can determine whether the change in measured signal quality exceeds a threshold change in signal quality. If the change in measured signal quality does not exceed the threshold change in signal quality, then the mobility state can be deemed to satisfy the mobility threshold criterion. Operation 450 can accordingly correspond to an embodiment of operation 330.

In an instance in which it is determined at operation 450 that the mobility state does satisfy the mobility threshold criterion, the method can proceed to operation 460, which can include the wireless communication device resending the first measurement report to the serving cell 104 as a report for a second measurement gap. As such, power can be conserved by not performing a second measurement for the second measurement gap, and perhaps even for further measurement gaps, in an instance in which a mobility state of the wireless communication device 102 since the measurement of operation 410 satisfies a mobility threshold criterion. Operation 460 can, for example, correspond to an embodiment of operation 340.

The mobility threshold criterion can be defined based at least in part on whether performance of a second measurement is likely to yield any additional information (e.g., a change in a measured parameter of the alternative cell 106). In this regard, if a mobility state of the wireless communication device 102 is not such that a second measurement is likely to reflect a deviation in a measured parameter of a level that may be of significance to the serving network in making a handover decision, then performance of another measurement during an ensuing measurement gap can be avoided, and the wireless communication device 102 can resend a previously sent measurement report to the serving network. The resulting reduction in the number of measurements can accordingly reduce power consumption and can accordingly prolong battery life.

If, however, it is determined at operation 450 that the mobility state does not satisfy the mobility threshold criterion, the method can proceed to operation 470 in lieu of operation 460. Operation 470 can include the wireless communication device 102 performing a second measurement of the alternative cell 106 during the second measurement gap and sending a second measurement report generated based at least in part on the second measurement to the serving cell 104. Thus, for example, in an instance in which a mobility state indicates that a new measurement can yield additional information that can be of value to the serving network in making a handover decision, the wireless communication device 102 can perform a new measurement and send a new measurement report for an ensuing measurement gap. Operation 470 can, for example, correspond to an embodiment of operation 350.

Figure 5:
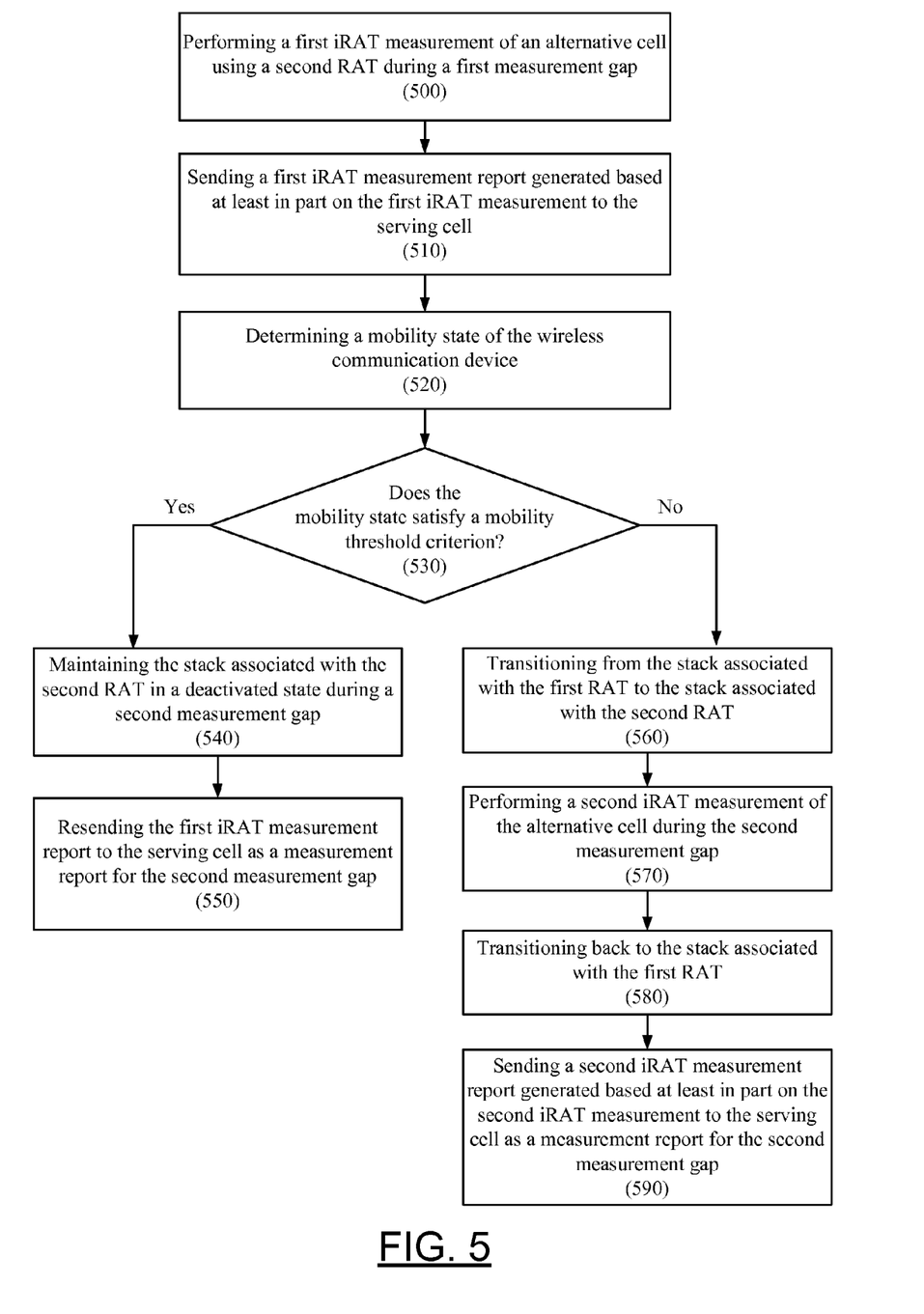
FIG. 5 illustrates a flowchart of an example method for reducing power consumption through reduced inter-RAT (iRAT) measurement frequency in accordance with some example embodiments.

FIG. 5 illustrates a flowchart of an example method for reducing power consumption through reduced iRAT measurement frequency in accordance with some example embodiments. In this regard, FIG. 5 illustrates an example embodiment of some embodiments of the method FIG. 3 and/or of the method of FIG. 4 in which the alternative cell 106 uses a different RAT than the serving cell 104. One or more of processing circuitry 210, processor 212, memory 214, transceiver(s) 216, or measurement reporting module 218 can, for example, provide means for performing the operations illustrated in and described with respect to FIG. 5. When performing the method of FIG. 5, the wireless communication device 102 can be connected to a serving cell, which uses a first RAT.

Operation 500 can include the wireless communication device 102 performing a first iRAT measurement of an alternative cell using a second RAT during a first measurement gap. Operation 500 can, for example, correspond to an embodiment of operation 300 and/or of operation 410. In order to perform the measurement, the wireless communication device 102 can deactivate (e.g., shut down) a stack associated with the first RAT and activate a stack associated with the second RAT. The measurement can be performed while the stack associated with the second RAT is activated. After performing the measurement and retaining the measurement value(s), the wireless communication device 102 can deactivate (e.g., shut down) the stack associated with the second RAT and reactivate the stack associated with the first RAT.

Operation 510 can include the wireless communication device 102 sending a first iRAT measurement report generated based at least in part on the first iRAT measurement to the serving cell. In this regard, operation 510 can, for example, correspond to an embodiment of operation 310 and/or of operation 420.

Operation 520 can include the wireless communication device 102 determining a mobility state of the wireless communication device 102. By way of example, operation 520 can correspond to an embodiment of operation 320 and/or of operation 440, and can include determining any of the mobility state indicators described above with respect to operations 320 and 440.

Operation 530 can include the wireless communication device 102 comparing the determined mobility state to a mobility threshold criterion and determining whether the mobility state satisfies the mobility threshold criterion. In this regard, operation 530 can, for example, correspond to an embodiment of operation 330 and/or of operation 450.

In an instance in which it is determined at operation 530 that the mobility state satisfies the mobility threshold criterion, the method can include performing operations 540-550. Operations 540-550 can, for example, collectively correspond to an embodiment of operation 340 and/or of operation 460.

Operation 540 can include the wireless communication device 102 maintaining the stack associated with the second RAT in a deactivated state during a second measurement gap. In this regard, power can be conserved by omitting transitioning to the second stack to perform a new measurement during the second measurement gap. In some example embodiments, the stack associated with the first RAT can be deactivated during the second measurement gap to achieve further power savings. Operation 550 can include the wireless communication device 102 resending the first iRAT measurement report to the serving cell as a measurement report for the second measurement gap.

If, however, it is determined at operation 530 that the mobility state does not satisfy the mobility threshold criterion, the method can instead include performing operations 560-590, and operations 540-550 can be omitted. Operations 560-590 can, for example, collectively correspond to an embodiment of operation 350 and/or of operation 470.

Operation 560 can include the wireless communication device 102 transitioning from the stack associated with the first RAT to the stack associated with the second RAT during the second measurement gap. In this regard, operation 560 can include deactivating (e.g., shutting down) the stack associated with the first RAT and activating the stack associated with the second RAT. Operation 570 can include the wireless communication device 102 performing a second iRAT measurement of the alternative cell during the second measurement gap.

Operation 580 can include the wireless communication device 102 transitioning back to the stack associated with the first RAT after performing the second iRAT measurement. In this regard, operation 580 can include deactivating (e.g., shutting down) the stack associated with the second RAT and reactivating the stack associated with the first RAT. Operation 590 can include the wireless communication device 102 sending a second iRAT measurement report generated based at least in part on the second iRAT measurement to the serving cell as a measurement report for the second measurement gap.

Figure 6:
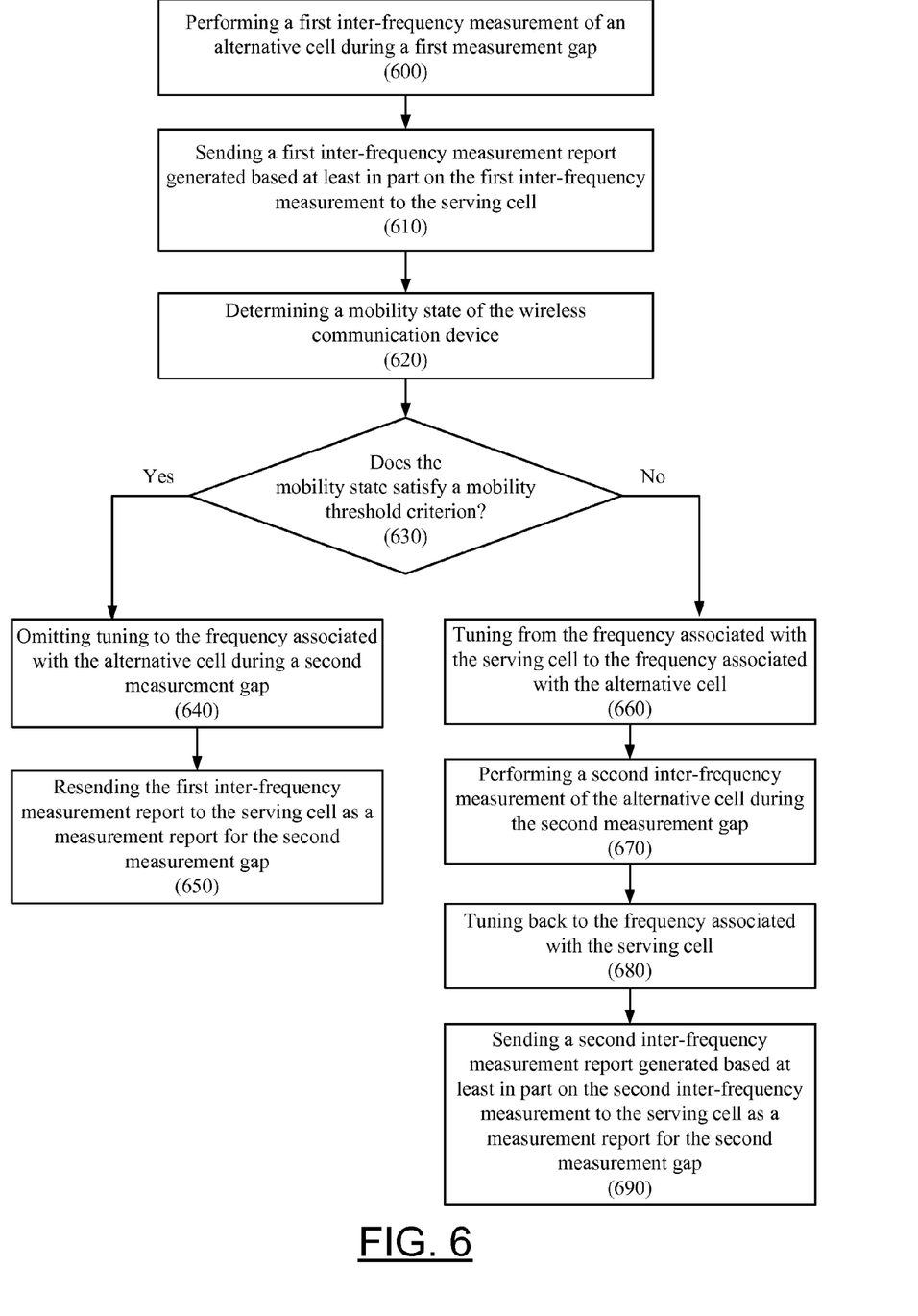
FIG. 6 illustrates a flowchart of an example method for reducing power consumption through reduced inter-frequency measurement frequency in accordance with some example embodiments.

FIG. 6 illustrates a flowchart of an example method for reducing power consumption through reduced inter-frequency measurement frequency in accordance with some example embodiments. In this regard, FIG. 6 illustrates an example embodiment of some embodiments of the method FIG. 3 and/or of the method of FIG. 4 in which the alternative cell 106 uses a different frequency than the serving cell 104. One or more of processing circuitry 210, processor 212, memory 214, transceiver(s) 216, or measurement reporting module 218 can, for example, provide means for performing the operations illustrated in and described with respect to FIG. 6. When performing the method of FIG. 6, the wireless communication device 102 can be connected to a serving cell, which uses a first frequency.

Operation 600 can include the wireless communication device 102 performing a first inter-frequency measurement of an alternative cell, which uses a second frequency that is different than the first frequency used by the serving cell, during a first measurement gap. Operation 600 can, for example, correspond to an embodiment of operation 300 and/or of operation 410. In order to perform the measurement, the wireless communication device 102 can tune from the frequency associated with the serving cell (e.g., "the first frequency") to the frequency associated with the alternative cell (e.g., "the second frequency"). The measurement can be performed while tuned to the second frequency. After performing the measurement and retaining the measurement value(s), the wireless communication device 102 can tune back to the first frequency.

Operation 610 can include the wireless communication device 102 sending a first inter-frequency measurement report generated based at least in part on the first inter-frequency measurement to the serving cell. In this regard, operation 610 can, for example, correspond to an embodiment of operation 310 and/or of operation 420.

Operation 620 can include the wireless communication device 102 determining a mobility state of the wireless communication device 102. By way of example, operation 620 can correspond to an embodiment of operation 320 and/or of operation 440, and can include determining any of the mobility state indicators described above with respect to operations 320 and 440.

Operation 630 can include the wireless communication device 102 comparing the determined mobility state to a mobility threshold criterion and determining whether the mobility state satisfies the mobility threshold criterion. In this regard, operation 630 can, for example, correspond to an embodiment of operation 330 and/or of operation 450.

In an instance in which it is determined at operation 630 that the mobility state satisfies the mobility threshold criterion, the method can include performing operations 640-650. Operations 640-650 can, for example, collectively correspond to an embodiment of operation 340 and/or of operation 460.

Operation 640 can include the wireless communication device 102 omitting tuning to the second frequency during a second measurement gap. In this regard, power can be conserved by omitting transitioning between frequencies and performing a new measurement. Operation 650 can include the wireless communication device 102 resending the first inter-frequency measurement report to the serving cell as a measurement report for the second measurement gap.

If, however, it is determined at operation 630 that the mobility state does not satisfy the mobility threshold criterion, the method can instead include performing operations 660-690, and operations 640-650 can be omitted. Operations 660-690 can, for example, collectively correspond to an embodiment of operation 350 and/or of operation 470.

Operation 660 can include the wireless communication device 102 tuning from the first frequency to the second frequency. Operation 670 can include the wireless communication device 102 performing a second inter-frequency measurement of the alternative cell during the second measurement gap while tuned to the second frequency. Operation 680 can include the wireless communication device 102 tuning back to the first frequency after performing the second inter-frequency measurement. Operation 690 can include the wireless communication device 102 sending a second inter-frequency measurement report generated based at least in part on the second inter-frequency measurement to the serving cell as a measurement report for the second measurement gap.

In some example embodiments, freshness criteria can be applied to a previous measurement, even if a mobility state of the wireless communication device 102 continues to satisfy the mobility threshold criterion over a number of configured measurement gaps. For example, in some embodiments, there can be defined a maximum number, n, measurement gaps for which a previously sent measurement report can be resent. Thus, for example, if the wireless communication device 102 has sent the same measurement report n consecutive measurement periods, or has otherwise gone n measurement gaps without performing a new measurement, the wireless communication device 102 can perform a new measurement and send a new measurement report to the serving network even if the mobility state of the wireless communication device 102 continues to satisfy the mobility threshold criterion. The application of freshness criteria in accordance with such example embodiments can be combined with the techniques illustrated in and described with respect to the methods of one or more of FIGS. 3-6.

In some example embodiments, a quality of the mobility state of the wireless communication device 102 can be used by the wireless communication device 102 to define a number of consecutive measurement gaps for which performing a new measurement can be omitted. In this regard, telescopic intervals between measurements can be applied based on a quality of a mobility state in some example embodiments. For example, if the wireless communication device 102 has remained substantially stationary for at least a first threshold period of time (e.g., 1 minute), then the wireless communication device 102 can perform a new measurement of the alternative cell 106 every n measurement gaps. However, if the wireless communication device 102 has remained substantially stationary for at least a second threshold period of time, with the second threshold period of time being greater than the first threshold period of time (e.g., 5 minutes), the wireless communication device 102 can perform a new measurement of the alternative cell 106 every m measurement gaps, where m can be greater than n.

As another example, if the wireless communication device 102 is in a mobility state, a degree of mobility of the wireless communication device 102 can be used to determine a minimum measurement frequency and define a maximum number of measurement gaps for which a previously sent measurement report can be resent. For example, if a velocity of the wireless communication device 102 is less than a threshold velocity, the wireless communication device 102 of some embodiments can perform a new measurement of the alternative cell 106 at least every n measurement gaps, whereas if the velocity exceeds the threshold velocity, the wireless communication device 102 of such embodiments can perform a new measurement of the alternative cell at least every m measurement gaps, wherein m can be less than n. It will be appreciated that in such embodiments, a series of thresholds can be applied such that more frequent measurements can be performed with an increasing degree of mobility.

Accordingly, the wireless communication device 102 of some example embodiments can be configured to apply its own measurement gap wakeup pattern based at least in part on the mobility state of the device to selectively determine whether to perform a new measurement during a measurement gap. The resulting decrease in frequency of performing measurements can accordingly reduce power consumption by the wireless communication device through elimination of performing measurements in situations in which it can be deemed that performing a new measurement can be unnecessary.

Figure 7:
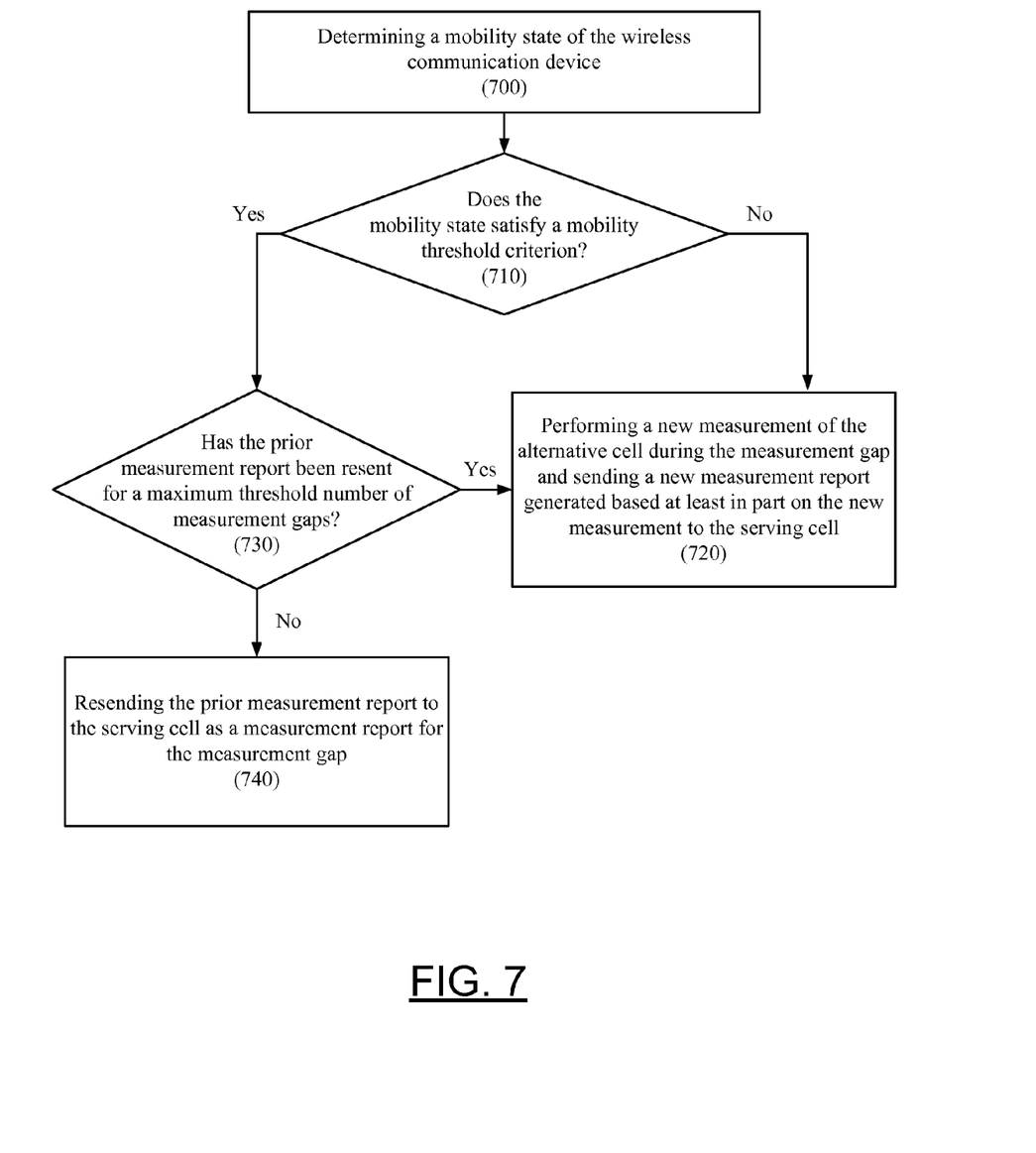
FIG. 7 illustrates a flowchart of an example method for determining whether to perform a new measurement based on both device mobility and compliance with freshness criteria in accordance with some example embodiments.

FIG. 7 illustrates a flowchart of an example method for determining whether to perform a new measurement based on both device mobility and compliance with freshness criteria in accordance with some example embodiments. In this regard, FIG. 7 illustrates operations that can be performed by the wireless communication device 102 in accordance with various example embodiments. One or more of processing circuitry 210, processor 212, memory 214, transceiver(s) 216, or measurement reporting module 218 can, for example, provide means for performing the operations illustrated in and described with respect to FIG. 7.

When performing the method of FIG. 7, the wireless communication device 102 can be connected to the serving cell 104. Operation 700 can include the wireless communication device 102 determining a mobility state of the wireless communication device 102. In this regard, operation 700 can, for example, correspond to an embodiment of one or more of operation 320, operation 440, operation 520, or operation 620. As such, the mobility state can be determined for a point in time and/or for a period following the performance of a prior measurement of alternative cell 106.

Operation 710 can include the wireless communication device 102 determining whether the mobility state satisfies a mobility threshold criterion. In this regard, operation 710 can, for example, correspond to an embodiment of one or more of operation 330, operation 450, operation 530, or operation 630.

In an instance in which it is determined at operation 710 that the mobility state does not satisfy the mobility threshold criterion, the method can proceed to operation 720, which can include the wireless communication device 102 performing a new measurement of the alternative cell 106 during the measurement gap and sending a new measurement report generated based at least in part on the new measurement to the serving cell 104. Operation 720 can, for example, correspond to an embodiment of one or more of operation 350, operation 470, operations 560-590, or operations 660-690.

If, however, it is determined at operation 710 that the mobility state does satisfy the mobility threshold criterion, the method can instead proceed to operation 730, which can include determining whether the prior measurement report (e.g., the measurement report sent/resent for the previous measurement gap) has been resent for a maximum threshold number of measurement gaps (e.g., a maximum threshold number of consecutive measurement gaps). The maximum threshold number of measurement gaps can, for example, be defined by the wireless communication device 102 based at least in part on the mobility state of the wireless communication device 102, as described above.

In an instance in which it is determined at operation 730 that the prior measurement report has been resent for a maximum threshold number of measurement gaps, the method can proceed to operation 720 such that a new measurement can be performed to ensure freshness in case conditions have changed since the prior measurement even though the mobility state of the wireless communication device 102 satisfies the mobility threshold criterion.

If, however, it is determined at operation 730 that the prior measurement report has not been resent for a maximum threshold number of measurement gaps, the method can instead proceed to operation 740, which can include the wireless communication device 102 resending the prior measurement report to the serving cell as a measurement report for the measurement gap. the wireless communication device 102 can additionally increment a count of the number of times the prior measurement report has been resent such that the wireless communication device 102 can evaluate at the next measurement gap whether the measurement report has been resent for the maximum threshold number of measurement gaps (operation 730) in the event that the mobility state of the wireless communication device 102 continues to satisfy the mobility threshold criterion at the next measurement gap.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for reducing power consumption through reduced measurement frequency, the method comprising:
by a wireless communication device:
performing a first measurement of an alternative cell during a first measurement gap;
sending a first measurement report generated based at least in part on the first measurement to a serving cell of a serving network;
determining a mobility state of the wireless communication device;
comparing the mobility state to a mobility threshold criterion, wherein if the mobility state satisfies the mobility threshold criterion, mobility of the wireless communication device does not exceed a mobility threshold;
in an instance in which the mobility state satisfies the mobility threshold criterion and the first measurement report has not been resent for a maximum threshold number of consecutive measurement gaps, resending the first measurement report to the serving cell as a measurement report for a second measurement gap; and
in an instance in which (i) the mobility state does not satisfy the mobility threshold criterion or (ii) the first measurement report has been resent for the maximum threshold number of consecutive measurement gaps, performing a second measurement of the alternative cell during the second measurement gap and sending a second measurement report generated based at least in part on the second measurement to the serving cell.

2. The method of claim 1, wherein:
determining the mobility state of the wireless communication device comprises determining a change in position of the wireless communication device since performance of the first measurement;
the mobility threshold criterion comprises a threshold change in position; and
the determined mobility state satisfies the mobility threshold criterion in an instance in which the change in position of the wireless communication device since performance of the first measurement does not exceed the threshold change in position.

3. The method of claim 1, wherein:
determining the mobility state of the wireless communication device comprises determining a velocity of the wireless communication device;
the mobility threshold criterion comprises a threshold velocity; and
the determined mobility state satisfies the mobility threshold criterion in an instance in which the velocity of the wireless communication device does not exceed the threshold velocity.

4. The method of claim 1, wherein:
  determining the mobility state of the wireless communication device comprises determining a change in signal quality of the serving cell;
  the mobility threshold criterion comprises a threshold change in signal quality; and
  the determined mobility state satisfies the mobility threshold criterion in an instance in which the change in signal quality of the serving cell does not exceed the threshold change in signal quality.

5. The method of claim 1, wherein the serving network uses a first radio access technology (RAT), wherein the alternative cell uses a second RAT, and wherein the first measurement report comprises an inter-RAT (iRAT) measurement report.

6. The method of claim 5, further comprising the wireless communication device:
  maintaining a second stack associated with the second RAT in a deactivated state during the second measurement gap in an instance in which the determined mobility state satisfies a mobility threshold criterion; and
  transitioning from a first stack associated with the first RAT to the second stack during the second measurement gap in an instance in which the determined mobility state does not satisfy the mobility threshold criterion.

7. The method of claim 5, wherein the first RAT is a Long Term Evolution (LTE) RAT, and wherein the second RAT is one of a second generation (2G) RAT or a third generation (3G) RAT.

8. The method of claim 1, wherein the alternative cell comprises a neighboring cell of the serving network, and wherein the first measurement report comprises an inter-frequency measurement report.

9. The method of claim 1, further comprising the wireless communication device defining the maximum threshold number of consecutive measurement gaps based at least in part on the mobility state.

10. The method of claim 1, wherein the wireless communication device is in connected mode on the serving network.

11. A wireless communication device comprising processing circuitry configured to cause the wireless communication device to at least:
  perform a first measurement of an alternative cell during a first measurement gap;
  send a first measurement report generated based at least in part on the first measurement to a serving cell of a serving network;
  determine a mobility state of the wireless communication device;
  compare the mobility state to a mobility threshold criterion;
  in an instance in which the mobility state satisfies the mobility threshold criterion and the first measurement report has not been resent for a maximum threshold number of consecutive measurement gaps, resend the first measurement report to the serving cell as a measurement report for a second measurement gap; and
  in an instance in which (i) the mobility state does not satisfy the mobility threshold criterion or (ii) the first measurement report has been resent for the maximum threshold number of consecutive measurement gaps, perform a second measurement of the alternative cell during the second measurement gap and send a second measurement report generated based at least in part on the second measurement to the serving cell.

12. The wireless communication device of claim 11, wherein the processing circuitry is further configured to cause the wireless communication device to:
  determine the mobility state of the wireless communication device at least in part by causing the wireless communication device to determine a change in position of the wireless communication device since performance of the first measurement;
  wherein the mobility threshold criterion comprises a threshold change in position; and
  wherein the determined mobility state satisfies the mobility threshold criterion in an instance in which the change in position of the wireless communication device since performance of the first measurement does not exceed the threshold change in position.

13. The wireless communication device of claim 11, wherein the processing circuitry is further configured to cause the wireless communication device to:
  determine the mobility state of the wireless communication device at least in part by causing the wireless communication device to determine a velocity of the wireless communication device;
  wherein the mobility threshold criterion comprises a threshold velocity; and
  wherein the determined mobility state satisfies the mobility threshold criterion in an instance in which the velocity of the wireless communication device does not exceed the threshold velocity.

14. The wireless communication device of claim 11, wherein the processing circuitry is further configured to cause the wireless communication device to:
  determine the mobility state of the wireless communication device at least in part by causing the wireless communication device to determine a change in signal quality of the serving cell;
  wherein the mobility threshold criterion comprises a threshold change in signal quality; and
  wherein the determined mobility state satisfies the mobility threshold criterion in an instance in which the change in signal quality of the serving cell does not exceed the threshold change in signal quality.

15. The wireless communication device of claim 11, wherein the serving network uses a first radio access technology (RAT), wherein the alternative cell uses a second RAT, and wherein the first measurement report comprises an inter-RAT (iRAT) measurement report.

16. The wireless communication device of claim 15, wherein the processing circuitry is further configured to cause the wireless communication device to:
  maintain a second stack associated with the second RAT in a deactivated state during the second measurement gap in an instance in which the determined mobility state satisfies a mobility threshold criterion; and
  transition from a first stack associated with the first RAT to the second stack during the second measurement gap in an instance in which the determined mobility state does not satisfy the mobility threshold criterion.

17. The wireless communication device of claim 11, wherein the alternative cell comprises a neighboring cell of the serving network, and wherein the first measurement report comprises an inter-frequency measurement report.

18. A non-transitory computer readable storage medium having computer program code stored thereon, the computer program code comprising program code, which, when executed by one or more processors implemented on a wireless communication device, is configured to cause the wireless communication device to perform a method comprising:
  performing a first measurement of an alternative cell during a first measurement gap;

sending a first measurement report generated based at least in part on the first measurement to a serving cell of a serving network;

determining a mobility state of the wireless communication device;

comparing the mobility state to a mobility threshold criterion;

in an instance in which the mobility state satisfies the mobility threshold criterion and the first measurement report has not been resent for a maximum threshold number of consecutive measurement gaps, resending the first measurement report to the serving cell as a measurement report for a second measurement gap; and in an instance in which (i) the mobility state does not satisfy the mobility threshold criterion or (ii) the first measurement report has been resent for the maximum threshold number of consecutive measurement gaps, performing a second measurement of the alternative cell during the second measurement gap and sending a second measurement report generated based at least in part on the second measurement to the serving cell.

\* \* \* \* \*